(12) United States Patent
Hawksworth

(10) Patent No.: US 11,346,305 B2
(45) Date of Patent: May 31, 2022

(54) GIMBAL ASSEMBLY AND MANUFACTURE THEREOF

(71) Applicant: Goodrich Actuation Systems Limited, Solihull (GB)

(72) Inventor: Andrew Hawksworth, Shropshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/075,876

(22) Filed: Oct. 21, 2020

(65) Prior Publication Data

US 2021/0033044 A1 Feb. 4, 2021

Related U.S. Application Data

(62) Division of application No. 16/015,422, filed on Jun. 22, 2018, now Pat. No. 10,837,405.

(30) Foreign Application Priority Data

Jun. 22, 2017 (EP) ...................................... 17177345

(51) Int. Cl.
*F16M 13/00* (2006.01)
*F02K 1/76* (2006.01)
*F16M 13/02* (2006.01)

(52) U.S. Cl.
CPC ............. *F02K 1/763* (2013.01); *F16M 13/02* (2013.01); *F05D 2230/50* (2013.01); *F05D 2250/313* (2013.01); *F05D 2250/42* (2013.01); *F05D 2260/57* (2013.01); *F05D 2300/6034* (2013.01)

(58) Field of Classification Search
None
See application file for complete search history.

(56) References Cited

U.S. PATENT DOCUMENTS

| 4,878,393 | A | 11/1989 | Duta |
| 5,498,208 | A | 3/1996 | Braun |
| 6,026,703 | A | 2/2000 | Stanisic |
| 6,371,820 | B1 | 4/2002 | Neisen |
| 6,466,414 | B1 | 10/2002 | Chung et al. |
| 6,697,118 | B2 * | 2/2004 | Zadok .................. G03B 17/563 348/375 |

(Continued)

FOREIGN PATENT DOCUMENTS

EP 2865878 A1 4/2015

OTHER PUBLICATIONS

Extended European Seach Report for International Application No. 17177345.0 dated Jan. 3, 2018, 7 pages.

*Primary Examiner* — Steven M Marsh
(74) *Attorney, Agent, or Firm* — Cantor Colburn LLP

(57) ABSTRACT

A gimbal assembly comprises a body, comprising at least one pivot boss projecting radially outwards along a first pivot axis (V) from an outer surface of the body; a gimbal, comprising an outer case surrounding the body and at least one hole projecting radially outwards along a second pivot axis (H) to receive a pivot pin to pivotally couple the gimbal to a fixed structure. The second pivot axis (H) is perpendicular to the first pivot axis (V) and the outer case is formed at least partially from carbon fibre-reinforced polymer matrix composite material. The outer case comprises at least one cavity on its inner surface in which the at least one pivot boss is located to pivotally couple the gimbal to the body.

8 Claims, 5 Drawing Sheets

(56) References Cited

U.S. PATENT DOCUMENTS

| | | | |
|---|---|---|---|
| 6,707,501 B1 * | 3/2004 | McKay | H04N 5/2251 |
| | | | 348/373 |
| 7,991,252 B2 | 8/2011 | Cheng | |
| 9,260,194 B2 | 2/2016 | Francisco et al. | |
| 9,561,870 B2 * | 2/2017 | Zhou | B64D 47/08 |
| 9,816,666 B2 * | 11/2017 | Wang | F16M 11/18 |
| 9,874,308 B2 * | 1/2018 | Saika | B64D 47/08 |
| 10,047,898 B2 * | 8/2018 | Xie | F16M 13/02 |
| 10,315,781 B2 * | 6/2019 | Zhao | F16M 11/2071 |
| 10,473,162 B1 | 11/2019 | Bilal et al. | |
| 10,545,392 B2 * | 1/2020 | Zhang | B64C 39/024 |
| 10,557,503 B2 | 2/2020 | Bandera | |
| 2010/0301179 A1 | 12/2010 | Brown | |
| 2015/0377182 A1 | 12/2015 | Bastide | |
| 2016/0252049 A1 | 9/2016 | Maerky | |
| 2018/0372026 A1 | 12/2018 | Hawksworth | |

* cited by examiner

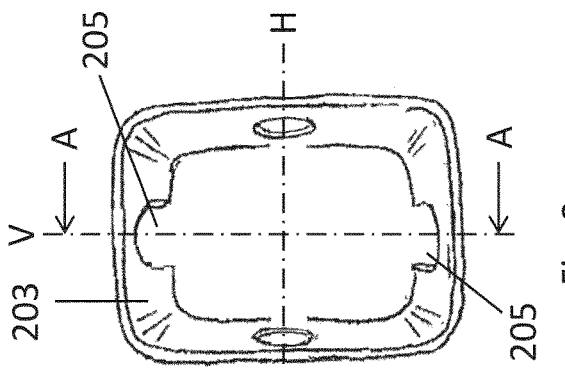
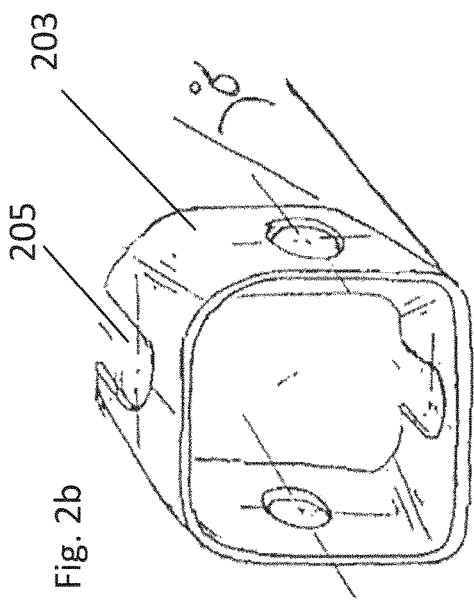
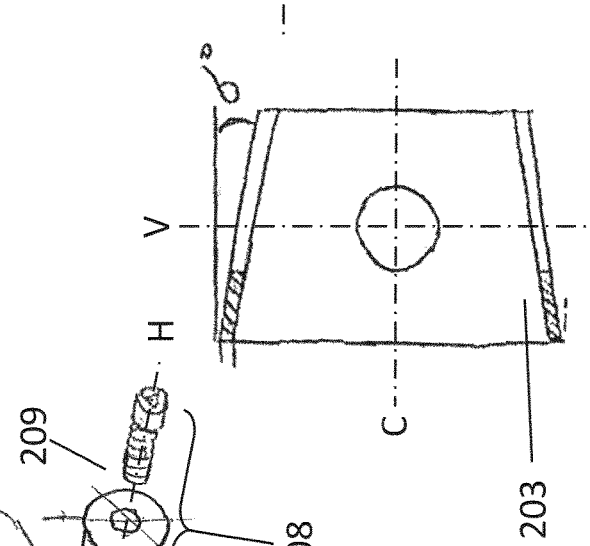
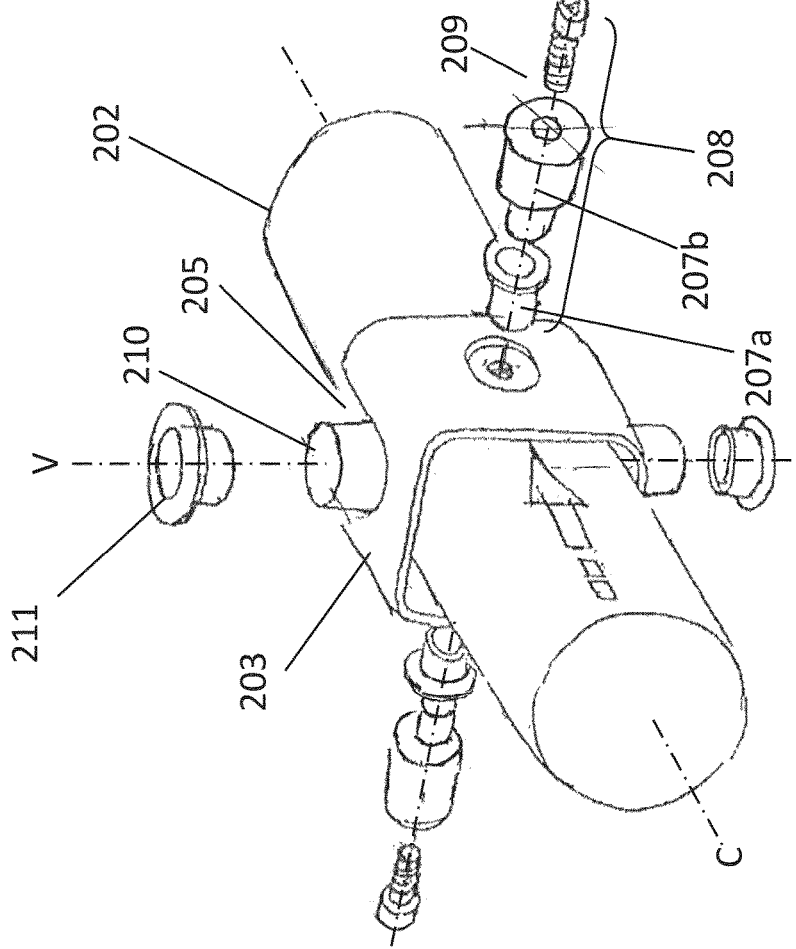

GIMBAL ASSEMBLY AND MANUFACTURE THEREOF

PRIORITY

This application is a division of U.S. patent application Ser. No. 16/015,422, filed Jun. 22, 2018 which claims priority to European Patent Application No. 17177345.0 filed Jun. 22, 2017, the disclosures of which are incorporated herein by reference in their entirety.

TECHNICAL FIELD

This present disclosure relates to a gimbal assembly and related methods for making a gimbal assembly.

BACKGROUND

Actuator gimbals typically found in thrust reverser actuation systems (TRAS) have demanding space envelope constraints. The gimbal is usually assembled to the actuator by inserting two opposing pivot pins through the gimbal into a hole on the actuator body, then retained using a strap and threaded bolts. The assembly requires space for access with mechanical tools. Designers are being challenged to reduce the envelope occupied by an actuator gimbal, especially in the context of thrust reverser actuation systems.

The present disclosure seeks to address these challenges.

SUMMARY

According to an aspect of the present disclosure there is provided a gimbal assembly comprising: a body comprising at least one pivot boss projecting radially outwards along a first pivot axis from an outer surface of the body; a gimbal comprising an outer case surrounding the body and at least one hole projecting radially outwards along a second pivot axis to receive a pivot pin to pivotally couple the gimbal to a fixed structure; wherein the second pivot axis is perpendicular to the first pivot axis; and wherein the outer case is formed at least partially from carbon fibre-reinforced polymer matrix composite material and the outer case comprises at least one cavity on its inner surface in which the at least one pivot boss is located to pivotally couple the gimbal to the body such that the body can pivot relative to the gimbal about the first pivot axis and the gimbal assembly can pivot relative to the fixed structure about the second pivot axis.

Thus it will be seen by those skilled in the art that, in accordance with the present disclosure, the outer case is formed at least partially from carbon fibre-reinforced polymer matrix composite material and has a direct pivotal coupling with the body, provided by locating each pivot boss in a corresponding cavity of the outer case. This means that the gimbal can occupy less space than in a conventional gimbal assembly. There is no need to use mechanical fasteners to attach the gimbal to the body. Moreover the carbon fibre-reinforced polymer matrix composite material provides a weight saving.

A gimbal assembly according to examples of the present disclosure may have a reduced part count as compared to a conventional gimbal assembly. Preferably the at least one pivot boss is integral with the body. For example, the body may be a monolithic structure having the at least one pivot boss formed to project radially outwards from an outer surface of the body. The body may be manufactured in any suitable way, as long as it is a single unitary body in the gimbal assembly. For example, the body may be made by casting, forging, machining, deposition or additive manufacturing. In at least some examples the body is made of a metallic material.

Each pivot boss is optionally surrounded by a bushing to enable pivotal coupling of the gimbal to the body. Each pivot boss may, for example, take the form of a cylindrical protrusion and its surrounding bushing may take the form of a cylindrical tube or sleeve.

In any example of the present disclosure, the body may comprise two pivot bosses projecting radially outwards from an outer surface of the body and both aligned with the first pivot axis.

In any example of the present disclosure, the gimbal may comprise two holes both aligned with the second pivot axis. In addition, or alternatively, the hole(s) may be throughholes passing through the outer case or recesses in an outer surface of the outer case. The hole(s) may be designed depending on the type of pivot pin(s) to be received therein, in use.

In any example of the present disclosure, the gimbal assembly may further comprise a pivot pin received in each hole projecting radially outwards along the second pivot axis to pivotally couple the gimbal to a fixed structure.

In any example of the present disclosure, the space envelope of the gimbal assembly may be reduced by minimising the size of the body within the gimbal assembly. In particular, the outer surface of the body may have a substantially circular cross-section. This can be contrasted with conventional gimbal assemblies, wherein the outer surface of the body is typically extended radially outwardly at the location of pivot pins that pivotally couple the body to the outer case of a gimbal, as each pivot pin and its mechanical fasteners must be accommodated. This is no longer required with each boss locating in a cavity in the outer case.

As will be disclosed in more detail below, in at least some examples the outer case is formed entirely from carbon fibre-reinforced polymer matrix composite material. The gimbal may therefore comprise a monolithic structure constructed entirely from carbon fibre-reinforced polymer matrix composite material. Of course, any bushing located in the hole(s) projecting radially outward along the second pivot axis and/or any pivot pin received therein, in use, to pivotally couple the gimbal to a fixed structure, may not be made from carbon fibre-reinforced polymer matrix composite material.

As will be disclosed in more detail below, in at least some examples the gimbal comprises a metal inner chassis that supports the carbon fibre-reinforced polymer matrix composite material of the outer case. The gimbal may therefore comprise a two-part structure.

In any example of the present disclosure, the body may be the body of an actuator, for example an extendable thrust reverser actuator. The body may comprise an actuator rod, cylinder or jack head. For example, a jack head may couple a telescoping coupling to an extensible actuator in a thrust reverser actuation system.

The present disclosure extends to a thrust reverser actuator comprising an elongate body and one or more gimbal assemblies as disclosed herein. In at least some examples, a thrust reverser actuator may comprise an elongate body and a pair of gimbal assemblies as disclosed herein mounted at opposite ends of the elongate body.

The Applicant has recognised that there may be a number of different ways to make a gimbal assembly as disclosed herein. Suitable manufacturing methods may exploit conventional carbon fibre winding techniques.

According to a first example of the present disclosure, a method of making a gimbal assembly comprises: providing a body comprising at least one pivot boss projecting radially outwards along a first pivot axis from an outer surface of the body; providing a spacer around the outer surface of the body and at least one fixing member to hold the spacer in a fixed position relative to the body, the spacer being shaped to allow the at least one pivot boss to extend therethrough; winding polymer-impregnated carbon fibers onto the spacer and around the at least one pivot boss so as to form an outer case of carbon fibre-reinforced polymer matrix composite material, the outer case surrounding the body with at least one hole projecting radially outwards along a second pivot axis, the second pivot axis being perpendicular to the first pivot axis; removing the spacer to leave a gimbal comprising the outer case with at least one cavity on its inner surface in which the at least one pivot boss is located to pivotally couple the outer case to the body such that the body can pivot relative to the outer case about the first pivot axis and the gimbal assembly can pivot about the second pivot axis.

In such examples the outer case may be formed entirely from carbon fibre-reinforced polymer matrix composite material. The gimbal may therefore comprise a monolithic structure constructed entirely from carbon fibre-reinforced polymer matrix composite material.

The method may optionally further comprise inserting a pivot pin into each hole projecting radially outwards along the second pivot axis, i.e. to pivotally couple the gimbal to a fixed structure.

The fixing member(s) provided to hold the spacer in a fixed position relative to the body during manufacture of the outer case of the gimbal may be removed together with the spacer. However, the Applicant has appreciated that the fixing member(s) may usefully form pivot pin(s) for the final gimbal and therefore avoid the need for pivot pins to be added in a separate manufacturing step. Thus, in at least some examples of this method, each fixing member may comprise a pivot pin passing through the spacer and an attachment member to (e.g. temporarily) attach the pivot pin to the outer surface of the body. Each pivot pin may project radially outward from the spacer along the second pivot axis. Each fixing member may optionally comprise a bushing that surrounds the pivot pin, although a bushing may instead be added at a later stage of manufacture or assembly. Each pivot pin passing through the spacer may then define the hole(s) in the outer case that project radially outwards along the second pivot axis. In at least some examples of this method, the step of removing the spacer may comprise removing the attachment member(s) and leaving the pivot pin(s) in situ. The pivot pins may then be used to pivotally couple the outer case of the gimbal to a fixed structure.

In some examples the spacer comprises an outer profile that tapers along a central axis that is perpendicular to both the first and second pivot axes. The outer profile may taper at a taper angle σ relative to the central axis. The outer profile is tapered from a wider end to a narrower end. The step of removing the spacer may consequently comprise applying a force to the spacer along the central axis towards the wider end of the outer profile so as to separate the spacer from the gimbal assembly. In these examples the taper of the outer profile preferably has a taper angle σ that is small, for example less than 10° or preferably less than 5°. This ensures that the outer case of the gimbal has a substantially constant inner diameter while still enabling the removal of the spacer after the outer case has been formed.

In some examples the spacer is formed of a soluble material. The step of removing the spacer may consequently comprise dissolving the spacer. In such examples a suitable solvent may be chosen to ensure that parts other than the spacer are not damaged during the dissolving procedure. In a subset of these examples the spacer is formed of a soluble material such as a plastic, wood, wax or sand-based material.

According to a second example of the present disclosure, a method of making a gimbal assembly comprises: providing a body comprising at least one pivot boss projecting radially outwards along a first pivot axis from an outer surface of the body; positioning two or more chassis portions, each of which comprises at least one collar portion, around the body such that the at least one boss is enclosed by two collar portions and the body is surrounded by the two or more chassis portions; wherein at least one of the chassis portions comprises at least one hole projecting radially outwards along a second pivot axis, the second pivot axis being perpendicular to the first pivot axis; winding polymer-impregnated carbon fibers onto the two or more chassis portions and around the collar portions to form an outer case of a gimbal that surrounds the outer surface of the inner case and secures the two chassis portions together, the outer case having at least one cavity on its inner surface in which the at least one pivot boss is located to pivotally couple the outer case to the body such that the body can pivot relative to the outer case about the first pivot axis and the gimbal assembly can pivot about the second pivot axis.

In such examples the gimbal comprises an inner chassis, formed from the two or more chassis portions, that supports the carbon fibre-reinforced polymer matrix composite material of the outer case. The gimbal may therefore comprise a two-part structure. In at least some examples the inner chassis is made of metal.

The method may optionally further comprise inserting a pivot pin into each hole projecting radially outwards along the second pivot axis, i.e. to pivotally couple the gimbal to a fixed structure. Optionally a bushing surrounds each pivot pin.

In examples according to any of the methods disclosed herein the carbon fibers may be wound generally circumferentially around the spacer or chassis portions, accommodating the one or more bosses and holes. It will be understood that winding the carbon fibers circumferentially means winding circumferentially at least in a plane defined by the first and second pivot axes.

In a subset of these examples, the carbon fibers may be wound according to a "cross-over" pattern, wherein the paths of the fibers loop around the one or more bosses and holes, and cross at points roughly equiangular from the first and second pivot axes. This pattern gives the final gimbal increased torsional load capacity.

Alternatively, or in addition, in a subset of these examples, the carbon fibers may be wound according to an "open-loop" pattern, wherein the paths of the fibers loop around the one or more bosses and holes, but do not cross other than at points that lie roughly on the first and second pivot axes. In other words, winding polymer-impregnated carbon fibers comprises winding the polymer-impregnated carbon fibers such the polymer-impregnated carbon fibers loop around the boss(es) and hole(s) and optionally such that the polymer-impregnated carbon fibers cross at points roughly equiangular from the first and second pivot axes.

In further examples the carbon fibers may be wound according to a "cross-over" pattern and an "open-loop" pattern in combination. In some of these examples the "cross-over" and "open-loop" patterns alternate.

Features of any example described herein may, wherever appropriate, be applied to any other examples of the present disclosure. Where reference is made to different examples, it should be understood that these are not necessarily distinct but may overlap.

BRIEF DESCRIPTION OF THE FIGURES

One or more non-limiting examples will now be described, by way of example only, with reference to the accompanying drawings, in which:

FIGS. 2a, 2b, 2c and 2d illustrate an intermediary stage in the construction of a gimbal assembly according to the present disclosure;

DETAILED DESCRIPTION

Figures 1A, 1B:
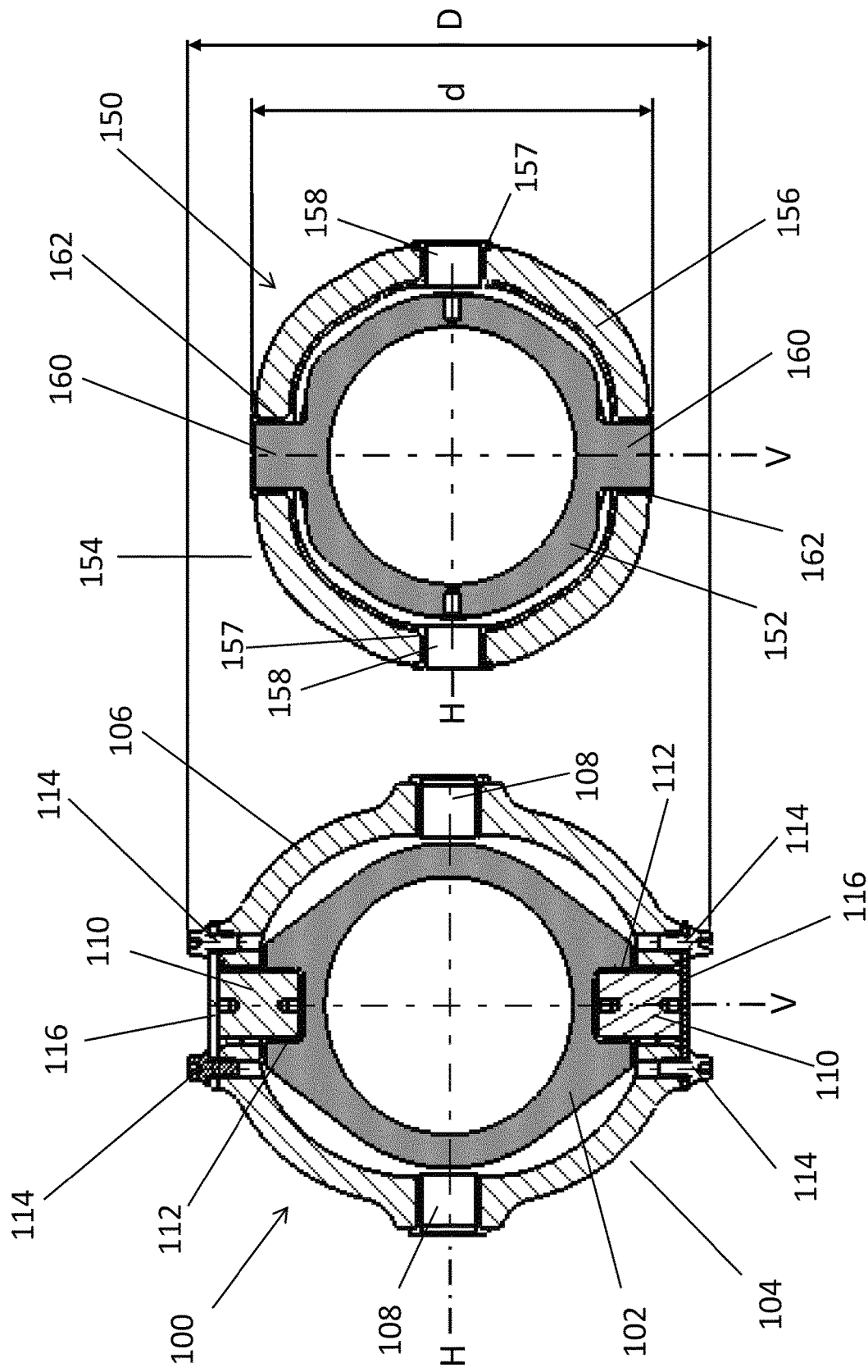
FIG. 1a is a cross-sectional view of a gimbal assembly according to examples typical of the prior art.
FIG. 1b is a cross-sectional view of gimbal assembly according to an example of the present disclosure.

FIG. 1a shows a cross section of a gimbal assembly 100 comprising an inner body 102 (such as an actuator body) and a gimbal 104, where the gimbal 104 encloses the body 102. The gimbal 104 and the body 102 are symmetrical about both a horizontal axis H and a vertical axis V.

The gimbal 104 comprises an outer case 106 and a pair of bushings 108 disposed within the outer case 106. The bushings 108 are cylindrical and positioned opposite one another within the outer case 106 to define a pivot axis located on the horizontal axis H. In use, the gimbal assembly 100 may be pivotally coupled to an external fixed structure by gimbal pins (not shown) that pass through the bushings 108. In a thrust reverser, for example, the gimbal assembly 100 may be pivotally coupled to a fixed structure such as a torque box.

The gimbal 104 further comprises two cylindrical pivot pins 110, disposed on opposite sides of the outer case 106 and positioned such that their primary axes lay along the vertical axis V. A portion of each of the pivot pins 110 passes through the outer case 106, with the remainder extending a small distance radially inward from the outer case 106 along the vertical axis V. Two retention screws 114 and a retention strap 116 mounted on the exterior of the outer case 106 secure each of the pivot pins 110 in place.

The inner body 102 has an inner diameter that is substantially circular, and has an outer diameter that is elongated along the vertical axis V and has a straight edge at the top and bottom. The outer surface of the body 102 therefore does not have a circular cross-section. There are cylindrical recesses 112 formed in the top and bottom edges of the outer surface of the body 102 which are shaped to receive the pivot pins 110. The pivot pins 110 extend radially inward from the gimbal 104 into the cylindrical recesses 112 so as to pivotally couple together the body 102 and the gimbal 104. This means that the body 102 can pivot relative to the gimbal 104 about the vertical axis V.

As mentioned above, the bushings 108 may enable the gimbal assembly 100 to be pivotally coupled to an external structure or component (not shown), and therefore allow the entire gimbal assembly 100 to pivot relative to the external structure or component about the horizontal axis H. Consequently the body 102 can be oriented in any direction relative to the external structure or component.

When constructing the gimbal assembly 100 pictured in FIG. 1a, the inner body 102 and gimbal 104 are manufactured separately, typically from materials such as steel or aluminium. The gimbal assembly 100 is then assembled by placing the body 102 inside the gimbal 104 and inserting the pivot pins 110 through the outer case 106 into the recesses 112 in the body 102. The retention strap 116 is then placed over each pivot pin 110, and the retention screws 114 are then inserted in order to secure the pivot pins 110. The bushings 108 may be inserted and secured to the outer case 106 either before or after the body 102 is in place.

It can be seen that the overall diameter D of the gimbal assembly 100 must accommodate the pivot pins 110, retention screws 114 and straps 116. Furthermore, during assembly there must be enough clearance for the pivot pins 110 to be inserted through the outer case 106 and to provide access for tools used to tighten the retention screws 114. Such considerations increase the envelope occupied by the gimbal assembly 100 in a larger architecture such as a thrust reverser.

FIG. 1b shows a cross-section of a gimbal assembly 150 according to an example of the present disclosure. The gimbal assembly 150 comprises an inner body 152 (such as an actuator body) and a gimbal 154. The body 152 has an inner diameter that is substantially circular and an outer diameter which is also substantially circular, with the exception of two protruding cylindrical pivot bosses 160, which extend radially outward on opposite sides of the body 152, with their primary axis of symmetry lying along a vertical axis V. The outer surface of the body 152 therefore has a substantially circular cross-section.

The gimbal 154 comprises an outer case 156, bushings 158 located in holes 157 laying on the horizontal axis H, and two pivot cavities 162. The pivot cavities 162 are positioned on opposite sides of the outer case 156 and are cylindrical, with their primary axis of symmetry laying on the vertical axis V. The body 152 is positioned interior to the gimbal 154, with the pivot bosses 160 positioned within the cavities 162. The pivot bosses 160 may be surrounded by bushings.

The pivot bosses 160 pivotally couple together the body 152 and the gimbal 154 such that the body 152 can pivot relative to the gimbal 154 about the vertical axis V. The vertical axis V is therefore a first pivot axis.

The gimbal 154 also comprises two cylindrical bushings 158, which are positioned within the outer case 156 with their primary axis of symmetry laying on a horizontal axis H, which passes through the centre of the gimbal assembly 150 and is perpendicular to the vertical axis V. The bushings 158 may be used to pivotally couple the gimbal assembly 150 to an external structure or component (not shown), and therefore allow the entire gimbal assembly 150 to pivot relative to the external structure or component about the horizontal axis H. The horizontal axis H is therefore a second pivot axis. Consequently the body 152 can be oriented in any direction relative to the external structure or component.

The outer case 156 is constructed at least partially of carbon fibre-reinforced polymer matrix composite material. In particular, the carbon fibre reinforcement may be wound directly onto the pivot bosses 160. Some exemplary processes for manufacturing the gimbal assembly 150 shown in FIG. 1b is detailed below with reference to FIGS. 2 to 5.

As will be appreciated by comparing FIGS. 1a and 1b, the overall diameter d of the gimbal assembly 150 is much reduced as compared to the diameter D of the traditional gimbal assembly 100. The space envelope is minimised by manufacturing the carbon fibre-reinforced polymer matrix composite material gimbal 154 directly onto the inner body 152. Not only does the gimbal 154 occupy less space, its location on the pivot bosses 160 removes the need to use mechanical fasteners to couple the gimbal 154 to the body 152. Moreover, the carbon fibre-reinforced polymer matrix composite material of the gimbal 154 provides a weight saving.

As seen in FIGS. 2a, 2b, 2c and 2d, an inner body 202 (such as the elongate body of an actuator rod in a thrust reverser actuator) comprises a solid cylinder with two cylindrical pivot bosses 210 extending radially outward along a vertical axis V from opposite sides of the cylinder. A pivot bushing 211 is placed over and around each of the pivot bosses 210. A temporary spacer 203, in this example having an outer profile with a square tubular form, is then positioned over the body 202 such that the body 202 passes through the open ends of the spacer 203 and the spacer 203 is centred on the pivot bosses 210. The spacer 203 comprises cut away sections 205 to allow the pivot bosses 210 to extend outwardly from the body 202 unimpeded.

FIG. 2d is a cut-away view of the spacer 203 from the plane illustrated by the arrows A-A in FIG. 2c. As is demonstrated in FIG. 2d along with FIGS. 2b and 2c, the spacer 203 has a tapered outer profile, with a taper angle σ relative to a central axis C, which, as will be described below, allows the spacer 203 to be easily removed later in the production process.

As is further seen from FIG. 2a, two outer fixture assemblies 208 are then secured to the spacer 203. Each outer fixture assembly 208 comprises a bushing 207a, a pin 207b, and a securing bolt 209 which are all substantially rotationally symmetric about a primary axis. The outer assemblies 208 are secured to opposite sides of the spacer 203, with the primary axis lying on a horizontal axis H, which is perpendicular to both the vertical axis V and the axis of symmetry of the body 202. The outer assemblies 208 are used to hold the spacer 203 in a fixed position relative to the body 202 during the subsequent manufacturing step(s).

Figure 3B:
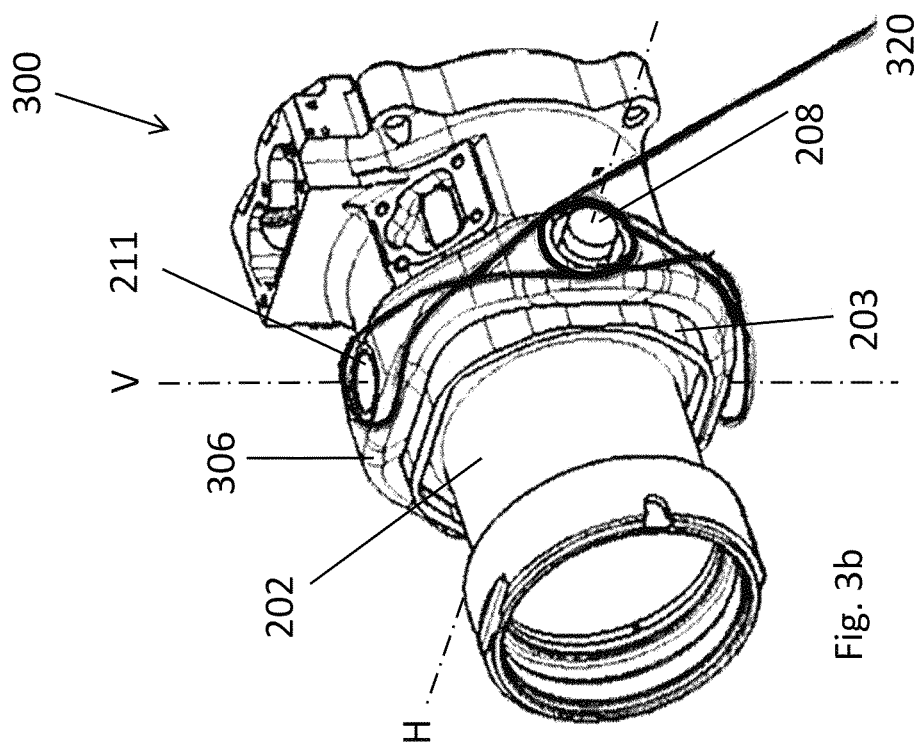
FIGS. 3a and 3b illustrate some exemplary winding patterns for a gimbal assembly according to the present disclosure.
Figure 3A:
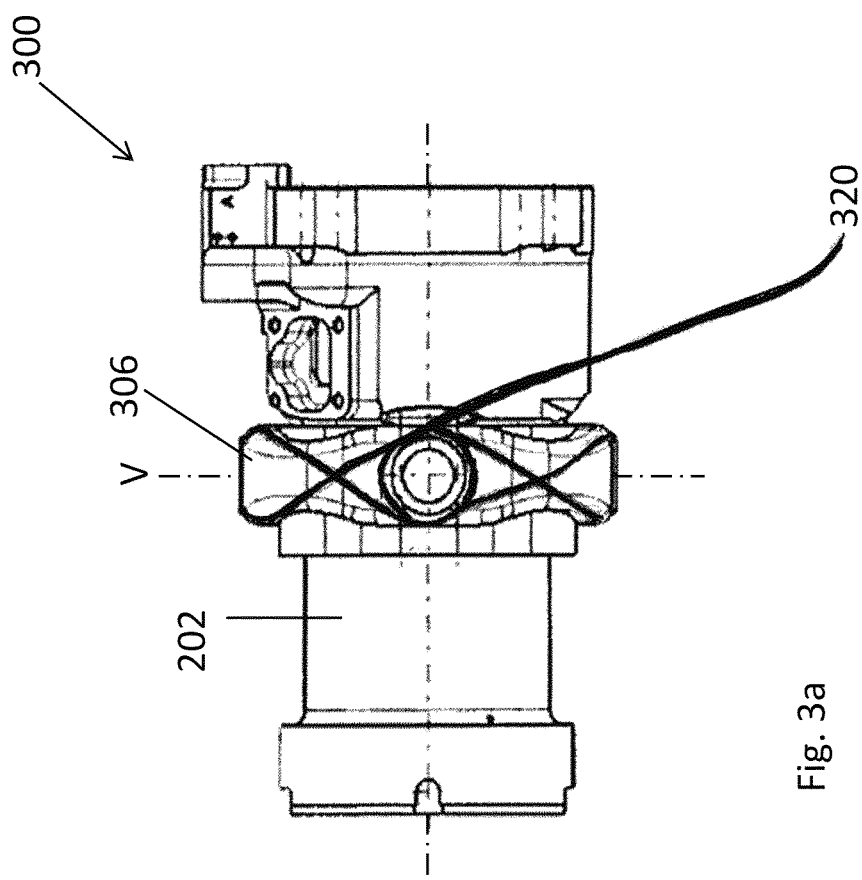

Referring now to FIGS. 3a and 3b, once the spacer 203 and the outer fixing assemblies 208 are in place, polymer resin-impregnated carbon fibers 320 are wound onto the spacer 203 such that an outer case 306 is built up with inner dimensions defined by the dimensions of the outer profile of the spacer 203. In this example, the outer case 306 is built up from carbon fibers 320 which are looped around each of the pivot bushes 211 as well as the outer fixture assemblies 208 so as to form a "cross-over" winding pattern, wherein the carbon fibers 320 cross at a point that is roughly equiangular between the horizontal axis H and the vertical axis V. The "cross-over" winding pattern increases the torsional load capacity of the outer case 306.

Figure 4B:
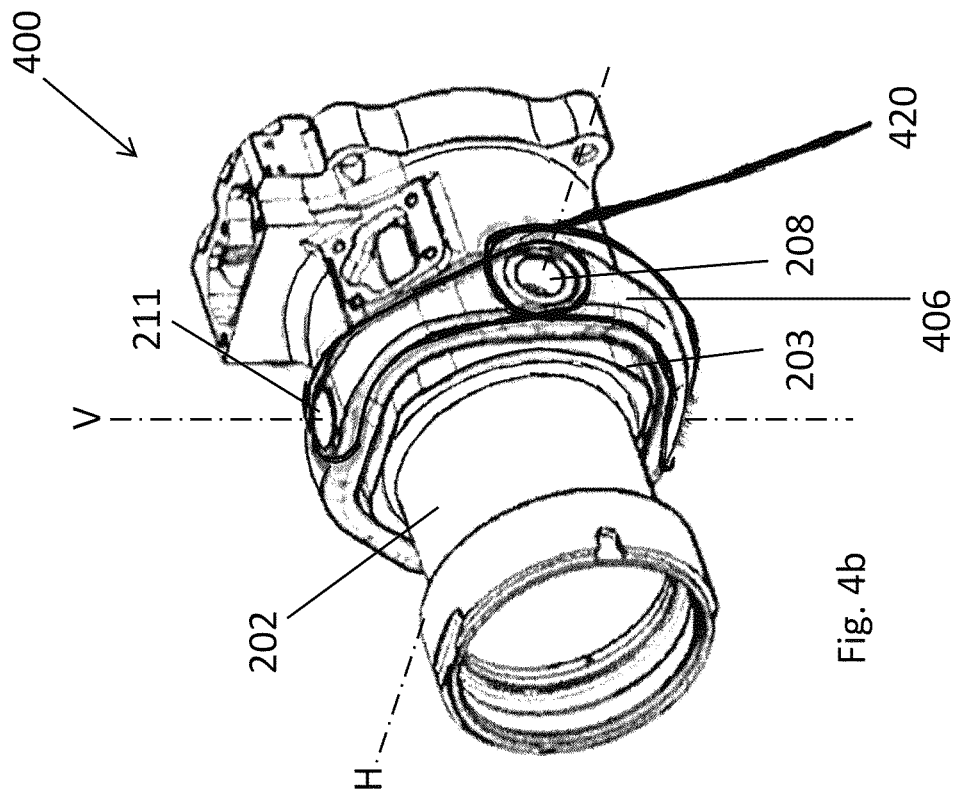
FIGS. 4a and 4b illustrate alternative exemplary winding patterns for a gimbal assembly according to the present disclosure.
Figure 4A:
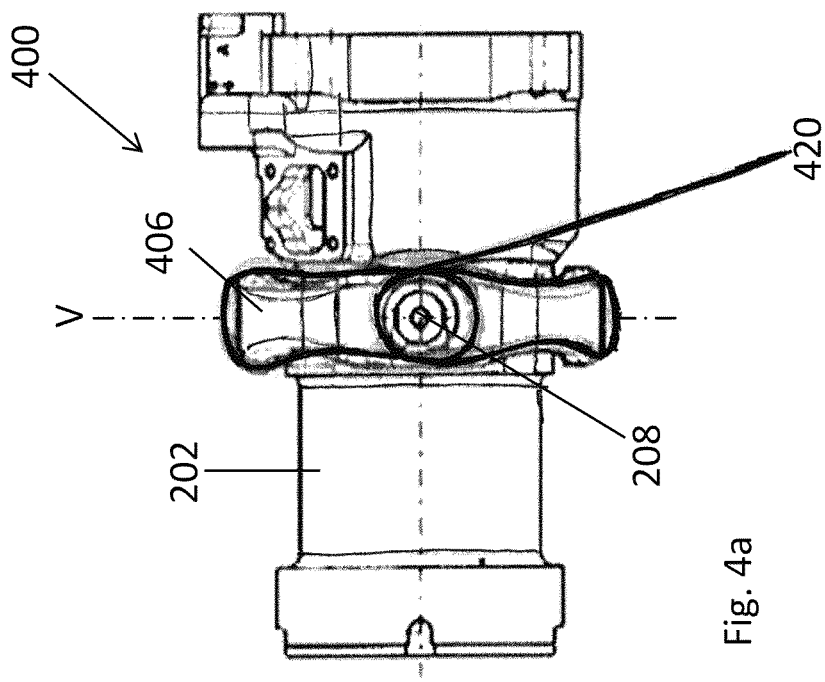

FIGS. 4a and 4b demonstrate the same production step but with a different winding pattern utilised to produce an outer case 406 with inner dimensions defined by the dimensions of the outer profile of the spacer 203, wherein polymer resin-impregnated carbon fibers 420 are wound substantially circumferentially around the spacer 203 so as to be looped around each of the pivot bushes 211 and the outer fixture assemblies 208, but without the fibers crossing between loops, so that an "open-loop" pattern is formed rather than a "cross-over" pattern.

Once a sufficient thickness of carbon fibre-reinforced polymer matrix composite material has been built up, the resultant part is cured such that the wound carbon fibers 320, 420 are fixed in placed in the polymer resin matrix and the outer case 306, 406 of a gimbal is formed. Suitable carbon fibre winding processes are well known in the art. For example, a four-axis or five-axis winding machine may be used. The carbon fibers may be drawn through a resin bath prior to winding, or pre-impregnated (so-called "prepreg") carbon fibers may be used.

Subsequently, the securing bolt 209 is removed from each of the outer fixture assemblies 208, and the spacer 203 is then able, due to its tapered outer profile, to be easily removed from its position between the body 202 and the newly formed outer case 306, 406. This leaves the outer case 306, 406 pivotally coupled to the body 202 via only the pivot bushes 211 and pivot pins 210. As a result the body 202 can freely pivot relative the outer case 306, 406 about the vertical axis V. The vertical axis V is therefore a first pivot axis of the gimbal assembly 300, 400.

As seen in FIGS. 2b and 2d, the taper angle σ is small, for example less than 10°, such that the dimensions of the outer profile of the spacer 203 are substantially constant in the region where polymer resin-impregnated carbon fibers 320, 420 are wound. The small taper angle σ enables removal of the spacer 203 as described above whilst ensuring that the inner dimensions of the outer case 306, 406 are substantially constant.

The remaining components of the outer fixture assemblies 208 may conveniently allow the gimbal assembly 300, 400 to be pivotally coupled to an external structure or component, such that the gimbal assembly 300, 400 can pivot relative to the external structure or component about the horizontal axis H. The horizontal axis H is therefore a second pivot axis of the gimbal assembly 300, 400. Consequently the body 202 can be orientated in any direction relative to the external structure or component.

As a result of winding the carbon fibre-reinforced polymer matrix composite material of the outer case 306, 406 directly onto the body 202, there is no need for the pivot pins 110, retention strap 116 and retention screws 114 of the gimbal assembly shown in FIG. 1a. As a result the part count, weight and size of the final product are reduced.

While it has been described above how an outer profile of the spacer 203 may be tapered to aid removing the spacer 203 after forming the outer case 306, 406, it will be appreciated that the spacer 203 may not be tapered. Regardless of the shape of the spacer, it may be removed in other ways, e.g. selective dissolution. A suitable soluble material may be chosen for the spacer 203 in such examples.

Figure 5B:
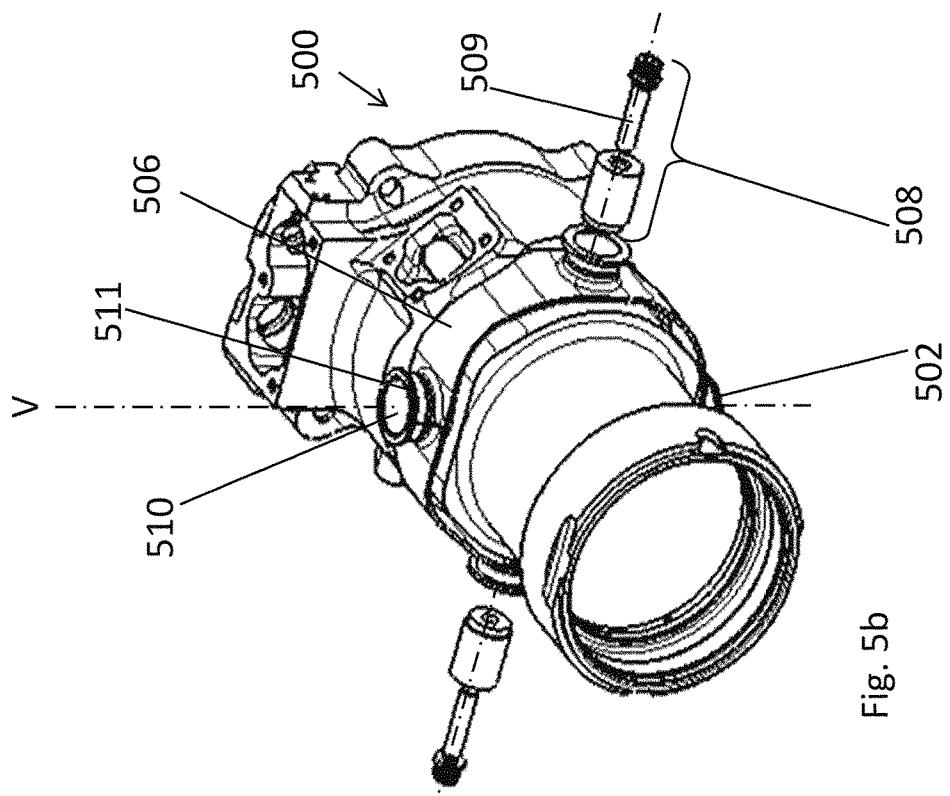
FIGS. 5a and 5b show a first stage in an alternative construction process for manufacturing a gimbal assembly according to an example of the present disclosure.
Figure 5A:
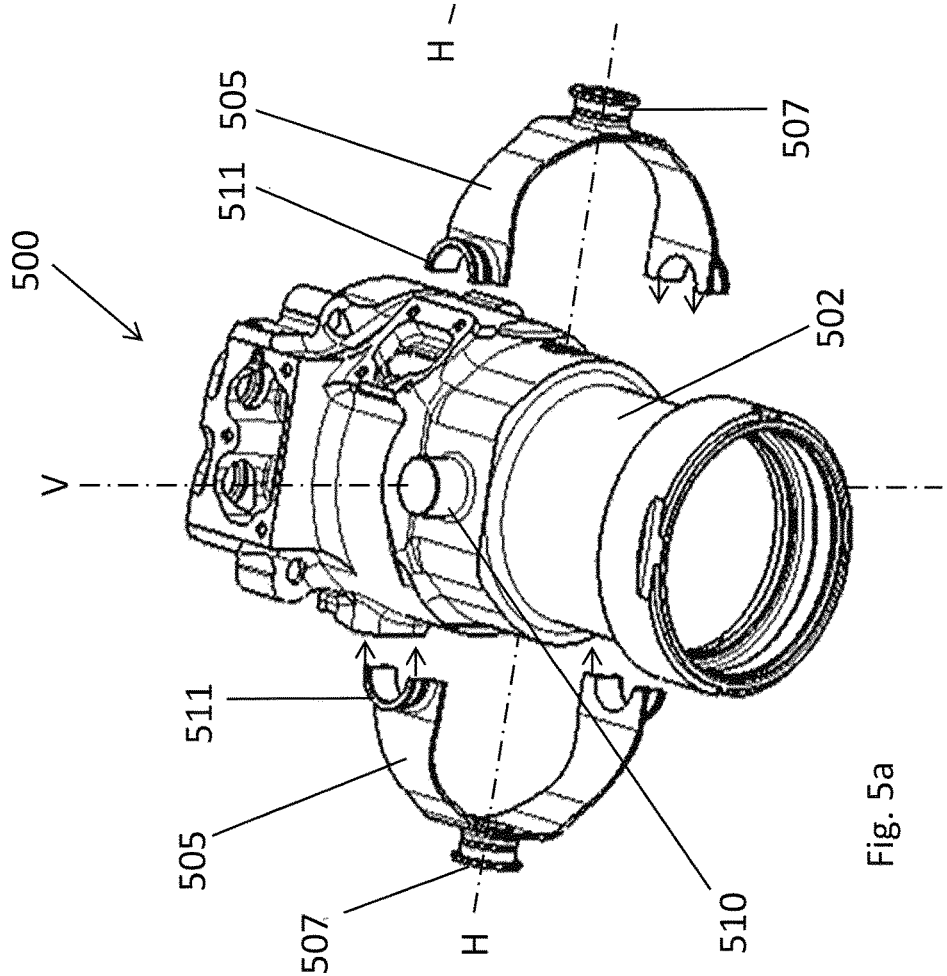

FIGS. 5a and 5b show an alternative construction process for manufacturing a gimbal assembly 500 according to the present disclosure. An inner body 502 (such as the body of an actuator rod) is provided that comprises a solid cylinder with two cylindrical pivot bosses 510 extending radially outward along a vertical axis V from opposite sides of the cylinder. Two metal chassis portions 505, each comprising two semi-collar portions 511 and one complete collar 507, are positioned such that they surround the inner body 502, and the semi-collar portions 511 are positioned to enclose the pivot bosses 510 such that a metal inner chassis 506 is formed. The complete collars 507 are positioned such that they lie on a horizontal axis H that is perpendicular to the vertical axis V and passes through the centre of the gimbal assembly 500.

Subsequently, two outer fixture assemblies 508, each comprising a pin and a securing bolt 509, are inserted through the complete collars 507 such that the securing bolt 509 secures the pin to the inner body 502. The pivot bosses 510 and the outer fixture assemblies 508 prevent the chassis portions 505 from moving during the next stage(s) of manufacture. The chassis portions 505 are sized so as to be spaced away from the outer surface of the inner body 502.

Once the chassis portions 505 and the outer fixture assemblies 508 are in place, polymer resin-impregnated carbon fibers are wound over the chassis portions 505 and around both the semi-collar portions 511 and the whole collars 507. The carbon fibre-reinforced polymer matrix composite material may be built up to form an outer case using, for example, one or more of the winding patterns that are demonstrated in FIGS. 3 and 4. Other winding patterns may alternatively be contemplated. Once the outer case of carbon fibre-reinforced polymer matrix composite material is complete, the part is cured, and the securing bolts 509 are removed. This allows the inner body 502 to pivot relative to the outer case about the vertical axis V. The vertical axis V is therefore a first pivot axis of the gimbal assembly 500. The pins of the outer fixture assemblies 508 may then be pivotally coupled to an external structure or component such that the outer case can pivot relative to the external structure or component about the horizontal axis H to act as a gimbal. The horizontal axis H is therefore a second pivot axis of the gimbal assembly 500.

In this example, the metal inner chassis 506 (formed by the chassis portions 505) stays in position after making the outer case of the gimbal and forms part of the final gimbal assembly 500. Manufacturing the outer case using the metal chassis portions 505 as a permanent inner chassis support for the carbon fibre-reinforced polymer matrix composite material can result in a strong outer case that is still has a reduced weight and part count as compared to conventional methods, but does not require the use of a spacer (e.g. as described in relation to FIG. 2) which needs to be removed after the outer case has been formed.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A method of making a gimbal assembly comprising:
   providing a body comprising at least one pivot boss projecting radially outwards along a first pivot axis from an outer surface of the body;
   providing a spacer around the outer surface of the body and at least one fixing member to hold the spacer in a fixed position relative to the body, the spacer being shaped to allow the at least one pivot boss to extend therethrough;
   winding polymer-impregnated carbon fibers onto the spacer and around the at least one pivot boss so as to form an outer case of carbon fiber reinforced polymer matrix composite material, the outer case surrounding the body with at least one hole projecting radially outwards along a second pivot axis, the second pivot axis being perpendicular to the first pivot axis;
   removing the spacer to leave a gimbal comprising the outer case with at least one cavity on its inner surface in which the at least one pivot boss is located to pivotally couple the outer case to the body such that the body can pivot relative to the outer case about the first pivot axis and the gimbal assembly can pivot about the second pivot axis.

2. A method of making a gimbal assembly according to claim 1, wherein the at least one fixing member comprises at least one pivot pin that projects radially outward through the spacer along the second pivot axis so as to define the at least one hole in the outer case, and at least one attachment member that temporarily attaches the at least one pivot pin to the outer surface of the body.

3. A method of making a gimbal assembly according to claim 2, wherein the step of removing the spacer comprises removing the at least one attachment member and leaving the at least one pivot pin in situ.

4. A method of making a gimbal assembly according to claim 1, wherein the spacer has an outer profile that tapers along a central axis and removing the spacer comprises applying a force to the spacer along the central axis.

5. A method of making a gimbal assembly according to claim 1, wherein the spacer is formed of a soluble material and the process of removal comprises dissolving the spacer in a solvent.

6. A method of making a gimbal assembly comprising:
   providing a body comprising at least one pivot boss projecting radially outwards along a first pivot axis from an outer surface of the body;
   positioning two or more chassis portions, each of which comprises at least one collar portion, around the body such that the at least one boss is enclosed by two collar portions and the body is surrounded by the two or more chassis portions;
   wherein at least one of the chassis portions comprises at least one hole projecting radially outwards along a second pivot axis, the second pivot axis being perpendicular to the first pivot axis;
   winding polymer-impregnated carbon fibers onto the two or more chassis portions and around the collar portions to form an outer case of a gimbal that surrounds the outer surface of the inner case and secures the two chassis portions together, the outer case having at least one cavity on its inner surface in which the at least one pivot boss is located to pivotally couple the outer case to the body such that the body can pivot relative to the outer case about the first pivot axis and the gimbal assembly can pivot about the second pivot axis.

7. A method of making a gimbal assembly according to claim 6, wherein the inner chassis is made of a metallic material.

8. A method of making a gimbal assembly according to claim 7, wherein winding polymer-impregnated carbon fibers comprises winding the polymer-impregnated carbon fibers such the polymer-impregnated carbon fibers loop around the at least one boss and the at least one hole and optionally such that the polymer-impregnated carbon fibers cross at points roughly equiangular from the first and second pivot axes.

* * * * *